March 8, 1927.  1,620,035
A. H. PAXTON
CARCASS SPLITTING MACHINE
Filed Aug. 21, 1926  4 Sheets-Sheet 1

INVENTOR.
A. H. Paxton
BY
James W. Martin
ATTORNEY.

March 8, 1927.

A. H. PAXTON 1,620,035

CARCASS SPLITTING MACHINE

Filed Aug. 21, 1926

INVENTOR.
A. H. Paxton
BY
James W. Martin
ATTORNEY.

March 8, 1927.

A. H. PAXTON 1,620,035

CARCASS SPLITTING MACHINE

Filed Aug. 21, 1926    4 Sheets-Sheet 3

INVENTOR.
A. H. Paxton
BY
James W. Martin
ATTORNEY.

March 8, 1927.

A. H. PAXTON 1,620,035

CARCASS SPLITTING MACHINE

Filed Aug. 21, 1926     4 Sheets-Sheet 4

Inventor
A. H. Paxton

By James W. Martin
Attorney

Patented Mar. 8, 1927.

1,620,035

UNITED STATES PATENT OFFICE.

ARTHUR H. PAXTON, OF OMAHA, NEBRASKA.

CARCASS-SPLITTING MACHINE.

Application filed August 21, 1926. Serial No. 130,691.

The invention relates to carcass splitting machines and has for its object to provide a machine mounted on a carrier which is adapted to move adjacent carcasses being moved or conveyed in a hanging position on an adjacent conveyor, thereby allowing the splitting operation to be accomplished simultaneously with the conveying operation, consequently reducing the cost of handling to a minimum, and preventing double handling, that is a conveying operation and a separate splitting operation.

A further object is to mount the splitting machine on a trackway and to provide said splitting machine with a pivoted beam forming a saw carriage, and which pivoted beam at its outer end is provided with a splitting element and means for moving said beam upwardly and downwardly whereby the splitting element will move in substantially a straight line. Also to provide carcass engaging arms for holding the carcass during a splitting operation whereby the carcass and the splitting machine will be maintained in proper relation during the movement thereof.

A further object is to provide the machine with a motor having driving connections with the splitting element and means whereby the movement of the pivoted beam may be controlled in its upward or downward movement or stopped as desired.

A further object is to provide means for controlling the movement of the pivoted beam, said means comprising rotatable gears, to which are frictionally connected arms, which arms have their ends provided with slidable connections with the beam and driving means whereby said gears may be rotated in either direction for raising or lowering the pivoted beam.

A further object is to mount the beam controlling gears on transversely disposed shafts, which shafts are laterally movable in guides between spaced driven gears and to provide the shafts with gears meshing with racks and with a hand wheel whereby the shaft gears may be easily and quickly moved into mesh with either of the constantly driven gears for reversing the direction of movement of the pivoted beam.

A further object is to provide driving means whereby the carcass splitting element and the beam controlling and driving mechanisms are driven from a single source of power.

A further object is to provide at opposite sides of the machine vertically movable carcass engaging arms, which arms are pivotally mounted, and held in raised or lowered positions by means of springs, and means cooperating with said arms whereby said arms are moved to operative and inoperative position until the pivotal points of the arms and the springs pass center, thereby allowing said springs to complete the operation. Also to provide means whereby said arms may have a gripping operation.

A further object is to provide the pivoted beam with a counterweight for partially balancing the same.

A further object is to provide spaced stops adjacent the pivoted beam and spaced lugs carried by the beam and cooperating with the stops for limiting the movement of the beam in either direction and causing the breaking of the frictional engagement of the arms carried by the driven gears of the reversing mechanism.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
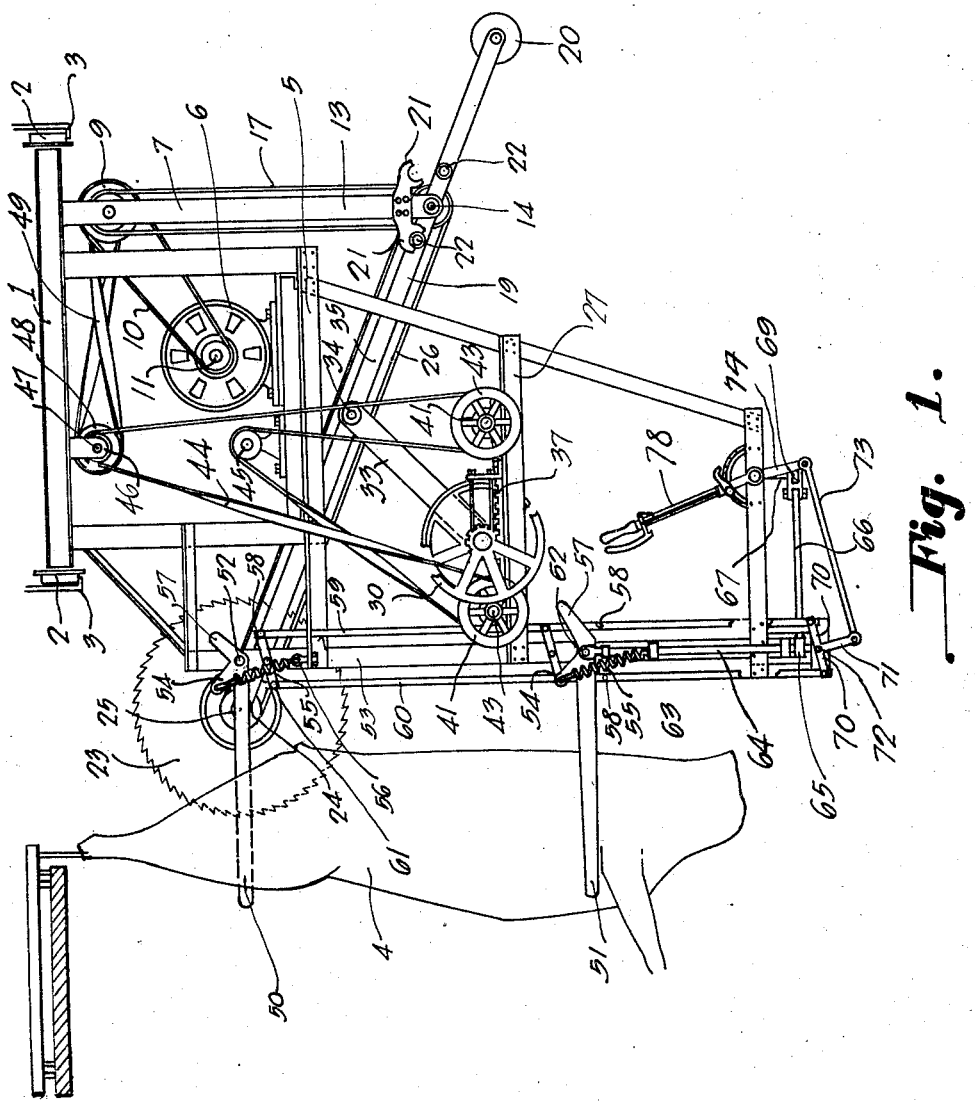
Figure 1 is a side elevation of the carcass splitting machine.
Figure 2:
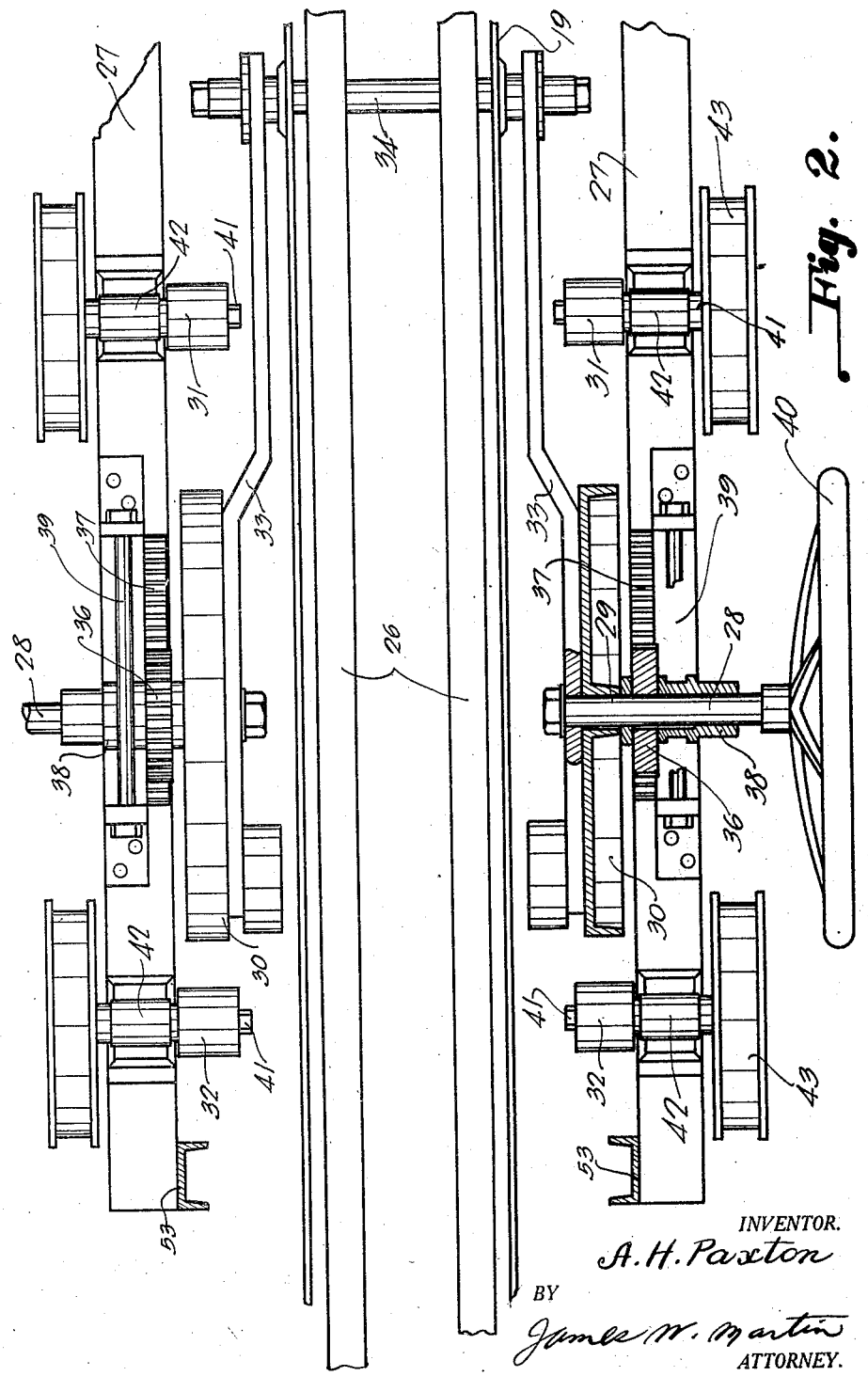
Figure 2 is a top plan view of the controlling and reversing mechanism, and a portion of the pivoted beam, part being shown in section to better show the structure.
Figure 3:
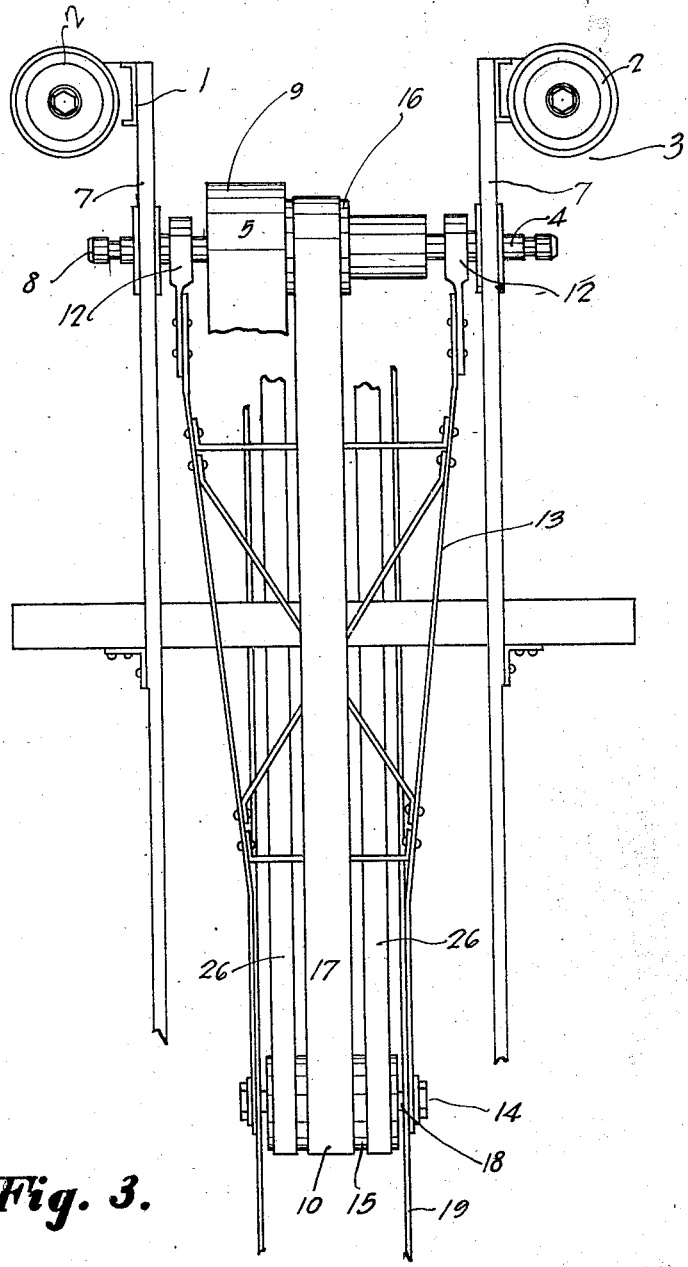
Figure 3 is a rear elevation of the machine.
Figure 4:
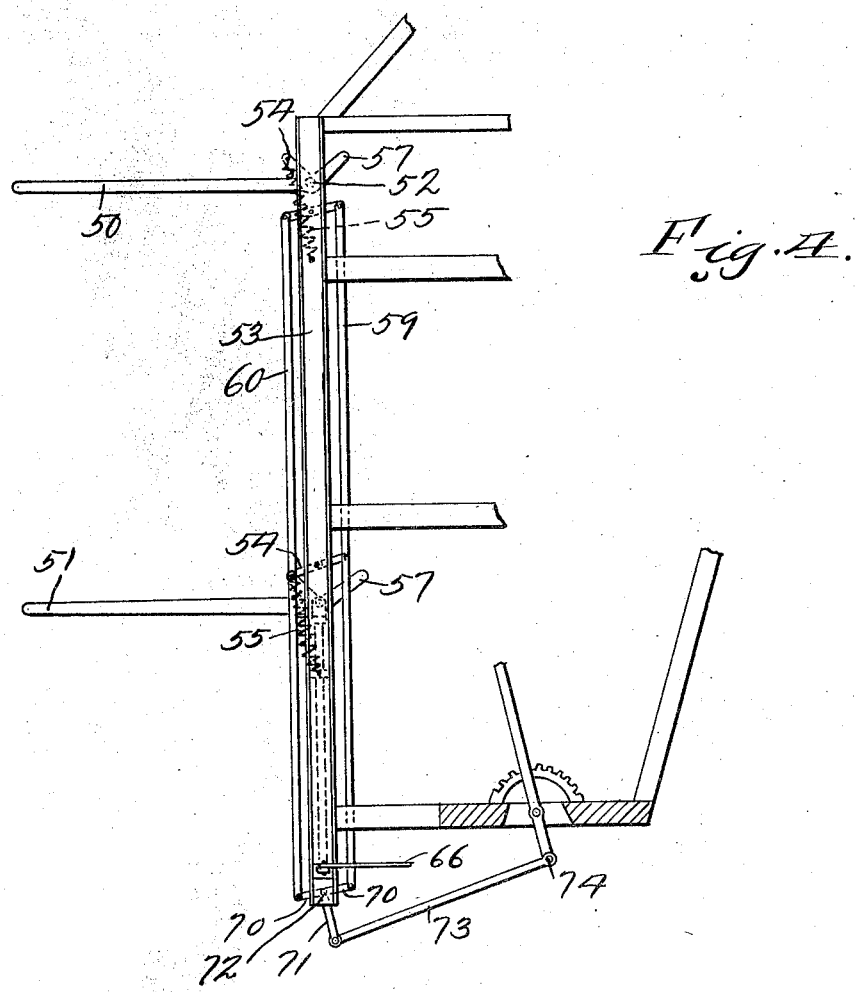
Figure 4 is a vertical longitudinal sectional view through the forward portion of the frame, showing some of the parts in elevation to better show the structure.

Referring to the drawings, the numeral 1 designates a carriage, which carriage is provided with flanged wheels 2, mounted on spaced tracks 3, whereby said carriage may be moved during the operation of the device and travel during the movement of the carcass 4, as said carcass is handled by a conveyor. Suspended beneath the carriage 1 and rigidly attached thereto is a platform 5, on which platform is mounted a motor 6 for driving the severing mechanism hereinafter set forth. Rotatably mounted in bearings of downwardly extending arms 7 carried by the carriage 1 is a driven shaft 8, which driven shaft is provided with a pulley 9, round which a belt 10 extends. The belt 10 extends around a pulley 11 of the motor 6, therefore it will be seen that during the operation of the motor the shaft 8 will be rotated. Pivotally mounted at 12 on the shaft 8 is a downwardly extending frame 13, which frame during the operation of the device, that is the severing device, moves in the direction of the arrow $a$ at its lower end. Rotatably mounted on a transversely disposed shaft 14 carried by the lower end of the frame 13 is a pulley 15, and extending around said pulley substantially centrally thereof, and around a pulley 16 carried by the shaft 8 is a belt 17, which belt drives the pulley 15 during the operation of the shaft 8. Pivotally mounted at 18 on the shaft 14 is a cutter frame 19, which cutter frame is adapted to pivotally move in a vertical longitudinal plane, as well as to move rearwardly in the direction of the arrow $a$ during a cutting operation, and which frame is preferably provided with a counterweight 20 rearwardly of its pivotal point for assisting in counterbalancing the frame. The rocking movement of the frame 19 on the shaft 14 may be limited if desired by the arms 21 carried by the frame 13, and which arms at the ends of the movements of the frame engage stops 22 carried by the frame.

Rotatably mounted in the outer end of the frame 19 is a saw 23, and which saw is carried by a shaft 24. Shaft 24 is provided with pulleys 25, and which pulleys are driven by means of belts 26 disposed at opposite sides of the saw, and which belts extend rearwardly and around the pulley 15 at opposite sides of the belt 17, therefore it will be seen that the saw 23 is constantly rotated during the operation of the motor 6, and it will also be seen that power from the motor is carried over the pivotal point of the frame 19 to the saw, thereby allowing freedom of movement of the frame 19 without interfering with the driving of the saw. Although a saw is shown it is obvious any kind of a severing element may be used.

Mounted on a platform 27, which platform is at opposite sides of the saw frame 26, are driving mechanisms for pivotally moving the saw frame 26. The driving mechanisms comprise axially disposed shafts 28, which shafts have rotatably and frictionally mounted thereon at 29 drive gears 30, which drive gears are adapted to be moved into and out of engagement with drive pinions 31 and 32, which are constantly driven for driving the gears 30 in one direction or in the other direction for raising or lowering the saw frame 26 during a carcass splitting operation. The adjacent inner sides of the gears 30 are provided with registering radially disposed arms 33, which arms have their ends connected to a transversely disposed shaft 34, which shaft extends through elongated openings 35 in the side rails of the frame 20, therefore it will be seen that when the gears 30 are rotated in either direction, the arms 33 will rotate therewith, and will cause a swinging of the saw frame 26 in a vertical longitudinal plane for a carcass splitting operation, at which time the saw 23 passes downwardly or upwardly according to which drive pinions 31 or 32 the gears 30 are in mesh with. Keyed on the shafts 28 are gears 36, which gears mesh with gear racks 37 beneath the same, and the shafts 28 are provided with guide collars 38, which are slidably mounted in guides 39, and form means whereby when the operator grasps the hand wheel 40, the shafts 28 with the gears 30 are accurately guided as said gears 30 are moved into engagement with the drive pinions 31 for rotating the gears 30 in one direction or into engagement with the guide pinions 32 for rotating the gears 30 in the opposite direction or reversing the direction of movement of the pivoted frame 19. During the rotation of the gears 30 in either direction the shaft 34 moves longitudinally into the slot 35. It will be noted that the arm 33 will move in an arc and will partially rotate during the down cutting operation and will partially rotate in the opposite direction during the return of the saw to initial position as shown in Figure 1. Drive pinions 31 and 32 are carried by shafts 41, which are rotatably mounted in bearings 42 and have their outer ends provided with pulleys 43, which are constantly driven by means of an endless belt 44, which belt extends over the pulleys 43 and an idle pulley 45, and over a pulley 46 carried by a countershaft 47, which countershaft is provided with a pulley 48, and over which pulley 48 a belt 49 extends. The belt 49 also extends over a pulley 7 carried by the shaft 8, therefore it will be seen that all of the mechanism is driven from a single source of power.

During the operation of the device the machine is moved over its trackway in any suitable manner, however it is preferably moved by connection to the carcass 4 which is moved over a trackway or conveyor during the handling of the invention, and it is one of the main objects of the invention to split the carcass during this handling operation thereby preventing double handling of the carcass, consequent loss of time. The gripping of the carcass is accomplished by means of outwardly extending pivoted arms 50 and 51 disposed at opposite sides of the carcass and which arms 50 and 51 are pivotally mounted at their inner ends and move in vertical longitudinal plane whereby as they are lowered to the position shown in Figure 1, they will move downwardly to horizontal positions, however the lower arms 51 preferably have a movement in a horizontal plane for gripping or compressing the opposite sides of the carcass. Arms 50 are pivotally connected at 52 to the channels 53 and are provided with arms 54, to which is connected a coiled spring 55. The other end of the coiled spring is anchored at 56 to the frame of the machine. It will be noted that when the arm 54 passes beyond a vertical position in either direction the spring 55 will move beyond the arms 50 to a vertical or horizontal position according to the direction of movement of the arm 54. Arms 50 are provided with angularly disposed arms 57, which arms 57 are in the path of lugs 58 carried by vertically disposed rods 59, and which rods move upwardly and downwardly. The arms 50 are in the path of vertically disposed rods 60, which are provided with lugs 61, which engage the arms 50. It will be noted that when the rods 60 are forced upwardly, the lugs 61 will engage the arms 50, raise the same until the arm 54 passes beyond a vertical position, and at which time the springs 55 will pull downwardly on the arms 54 and move the arms 50 to vertical positions, for instance after a carcass splitting operation. Upon an upward movement of the rod 59 the action is reversed and the arms 50 are moved to a horizontal position. The lower arms 51 operate in substantially the same manner as the upper arms 50 and the same numerals apply thereto, however in this case the arms 51 are pivotally mounted to a head 62, which head is carried at 63 by the upper end of a vertically disposed rock shaft 64. The lower end of the rock shaft 64 is provided with an arm 65, to which is connected a link 66, which is in turn connected to an arm 67 of the lever 68, there being a slot and pin connection between the arm 67 and the link 66 at 69 for allowing lost motion whereby the arms 51 will not be moved towards each other until said arms have assumed a horizontal position, that is moved towards each other for gripping opposite sides of the carcass 4. The lower ends of the rods 59 and 60 are pivotally connected to the arms 70 of a lever 71, which lever is pivotally mounted at 72 and has connected thereto a link 73 which link extends rearwardly and is pivotally connected to an arm 74 of a control lever 78, therefore it will be seen that when the lever 68 is initially moved forwardly the arms 70 will be rocked in a manner whereby the rod 59 will be forced upwardly for moving the arms 50 and 51 to a horizontal position, and on the final movement of the lever 68 the arms 51 will grip opposite sides of the carcass through the medium of the link 66 which will partially rotate the shaft 54.

From the above it will be seen that a carcass splitting machine is provided, which machine is simple in construction, provided with means for gripping and holding a carcass whereby said machine may perform a splitting operation during the movement of the carcass adjacent one side thereof, thereby reducing the cost of handling and splitting to a minimum and allowing the conveying operation and splitting operation to be accomplished at the same time.

The invention having been set forth what is claimed as new and useful is:—

1. A carcass splitting machine comprising a frame, means for gripping and holding a carcass adjacent said frame, a saw frame pivotally mounted, a saw carried by said frame at its free end, driving means for said saw, constantly rotated drive gears, shiftable gears between the constantly rotated gears, arms carried by said shiftable gears, the ends of said arms being pivotally connected to the saw frame and means for shifting said shiftable gears.

2. A carcass splitting machine comprising a travelling frame, a power unit carried by said frame, a downwardly extending pivoted frame, a saw frame pivotally connected to the downwardly extending pivoted frame, a saw carried by the free end of the saw frame, driving connections for the saw extending over the downwardly extending pivoted frame and the saw frame and means cooperating with the saw frame whereby said saw frame is pivotally moved in a vertical longitudinal plane downwardly and upwardly.

3. A carcass splitting machine comprising a frame, a downwardly extending pivoted frame carried by said frame, a saw frame pivoted to the downwardly extending frame, a saw carried by said saw frame, driving connections extending over the pivoted frame and the saw frame and shiftable gear means connected to the saw frame and forming means whereby said saw frame is oscillated in a vertical longitudinal plane.

4. The combination with a carcass splitting machine comprising a frame, an oscillating saw frame, a sawing element carried by said saw frame, driving means for said saw, of means for oscillating the saw frame, said means comprising a shaft, a drive gear carried by said shaft, a link connection between the drive gear and the saw frame, drive pinions at opposite sides of the drive gear and means for shifting the shaft laterally whereby the drive gear will be moved into mesh with either of the drive pinions.

5. The combination with a carcass splitting machine having an oscillating saw frame provided with a severing element, of means for oscillating said frame, said means comprising axially alined shafts, drive gears carried by said shaft, arms carried by said drive gears, said arms having slidable connections with the saw frame, drive pinions at opposite sides of the drive gears, and means whereby said drive gears can be moved into mesh with either of the drive pinions.

6. The combination with an oscillating severing element frame of a beef cutting machine, of means for oscillating said frame, said means comprising axially alined shafts at opposite sides of the frame, drive gears carried by said shafts, arms carried by said drive gears, slidable connections between said arms and the frame, guide collars on said shafts, guides in which said collars are slidably mounted, gears carried by said shafts, said gears meshing with racks and forming means whereby upon rotation of the shafts said drive gear will be moved into mesh with either of the drive pinions.

7. The combination with a carcass splitting machine having an oscillating frame provided with a severing element, of means for oscillating said frame, said means comprising shafts, drive gears carried by said shafts, link connections between the drive gears and the frame, drive pinions located at opposite sides of the drive gears, means whereby said drive shafts may be laterally moved towards and away from the drive pinions and a single driving means for the drive pinions and the severing element.

8. A carcass splitting machine comprising a travelling frame, a power unit carried by said frame, an oscillating severing element frame, a rotating severing element, drive connections between the rotating severing element and the power unit, means for oscillating said saw frame carried by the main frame as desired, said last named means being driven by the power unit and means whereby the oscillating frame can be stopped.

9. The combination with a travelling carcass splitting machine disposed adjacent means for conveying a carcass, of arms adapted to engage the carcass, said arms being pivotally mounted and movable to horizontal and vertical positions, members carried by said arms adjacent their pivotal points, springs connected to said members and to the frame of the machine, the pivotal points of the arms being movable through a line drawn through the ends of the springs whereby the springs will give the final movement to the arms after they reach predetermined positions, restoring arms carried by the arms, push rods, means for moving said push rods in opposite directions and lugs cooperating with said arms and restoring arms whereby said arms may be moved to positions where the springs will move them to vertical or horizontal positions.

In testimony whereof I hereunto affix my signature.

ARTHUR H. PAXTON.